(12) United States Patent
Koellisch et al.

(10) Patent No.: US 6,357,318 B1
(45) Date of Patent: Mar. 19, 2002

(54) STEERING COLUMN

(75) Inventors: David Koellisch, Lafayette; Michael W. Wilson, Attica; Richard J. Eckhart, Buck Creek, all of IN (US)

(73) Assignee: TRW Inc., Lyndhurst, OH (US)

( * ) Notice: Subject to any disclaimer, the term of this patent is extended or adjusted under 35 U.S.C. 154(b) by 11 days.

(21) Appl. No.: 09/596,119

(22) Filed: Jun. 16, 2000

(51) Int. Cl.$^7$ ................................................. B62D 1/18
(52) U.S. Cl. ........................................ 74/493; 280/775
(58) Field of Search ................... 74/493, 492; 280/775, 280/777

(56) References Cited

U.S. PATENT DOCUMENTS

| | | | |
|---|---|---|---|
| 4,240,305 A | | 12/1980 | Denaldi et al. |
| 4,449,419 A | | 5/1984 | Soler Brueguera |
| 5,131,287 A | | 7/1992 | Stromberg |
| 5,213,003 A | | 5/1993 | Speich |
| 5,678,454 A | | 10/1997 | Cartwright et al. |
| 5,788,277 A | * | 8/1998 | Hibino et al. ............... 280/775 |
| 5,988,010 A | * | 11/1999 | Olgren ......................... 74/493 |
| 6,139,057 A | * | 10/2000 | Olgren et al. ............... 280/775 |

* cited by examiner

*Primary Examiner*—David Fenstermacher
(74) *Attorney, Agent, or Firm*—Tarolli, Sundheim, Covell, Tummino & Szabo L.L.P.

(57) ABSTRACT

A steering column (10) includes a steering column member (12) rotatable to turn steerable vehicle wheels. A support tube (24) supports the steering column member (12) for rotation about a longitudinal axis (26) of the steering column member. The support tube (24) and the steering column member (12) extend between clamping members (32, 34) and are axially movable relative to the clamping members. The clamping members (32, 34) clamp the support tube (24) to prevent movement of the support tube and the steering column member (12) relative to the clamping members. A pivot shaft (38) pivotally connects the clamping members (32, 34) to a mounting bracket (42). A locking mechanism (78) presses the clamping members (32, 34) toward each other to clamp the support tube (24) to prevent axial movement of the support tube relative to the clamping members. The locking mechanism (18) also locks the clamping members (32, 34) in one of a plurality of pivot positions relative to the mounting bracket (42). The locking mechanism (78) has a locking shaft (82) extending through the clamping members (32, 34) and through side walls (52, 54) of the mounting bracket (42).

6 Claims, 3 Drawing Sheets

STEERING COLUMN

FIELD OF THE INVENTION

The present invention relates to a steering column, and more specifically, to an adjustable steering column.

BACKGROUND OF THE INVENTION

A known steering column is disclosed in U.S. Pat. No. 4,240,305. U.S. Pat. No. 4,240,305 discloses a steering column member housed in a support tube. A support bracket pivotally supports a resilient seat member which is engageable with the support tube. A locking mechanism locks the seat member to the support bracket to prevent movement of the seat member relative to the support bracket. The locking mechanism also clamps the seat member against the support tube to prevent movement of the support tube relative to the seat member. When the seat member is unclamped from the support tube, the support tube is free to slide axially within the seat member and the seat member can be pivoted about a shaft of the locking mechanism.

SUMMARY OF THE INVENTION

A steering column of the present invention includes a steering column member connectable with a steering wheel and rotatable to turn steerable vehicle wheels. A support tube circumscribes the steering column member and supports the steering column member for rotation about a longitudinal axis of the steering column member. First and second clamping members are engageable with the support tube. The support tube and the steering column member extend between the first and second clamping members and are axially movable relative to the first and second clamping members. The first and second clamping members are movable toward each other to clamp the support tube to prevent movement of the support tube and the steering column member relative to the first and second clamping members.

A mounting bracket connects the steering column to a vehicle frame and includes first and second side walls. A pivot shaft pivotally connects the first and second clamping members to the mounting bracket. A locking mechanism presses the first and second clamping members toward each other to clamp the support tube and prevent axial movement of the support tube and the steering column member relative to the first and second clamping members. The locking mechanism also locks the first and second clamping members in any one of a plurality of pivot positions relative to the mounting bracket. The locking mechanism has a locking shaft extending through the first and second clamping members and through the first and second side walls.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF THE INVENTION

Figure 1:
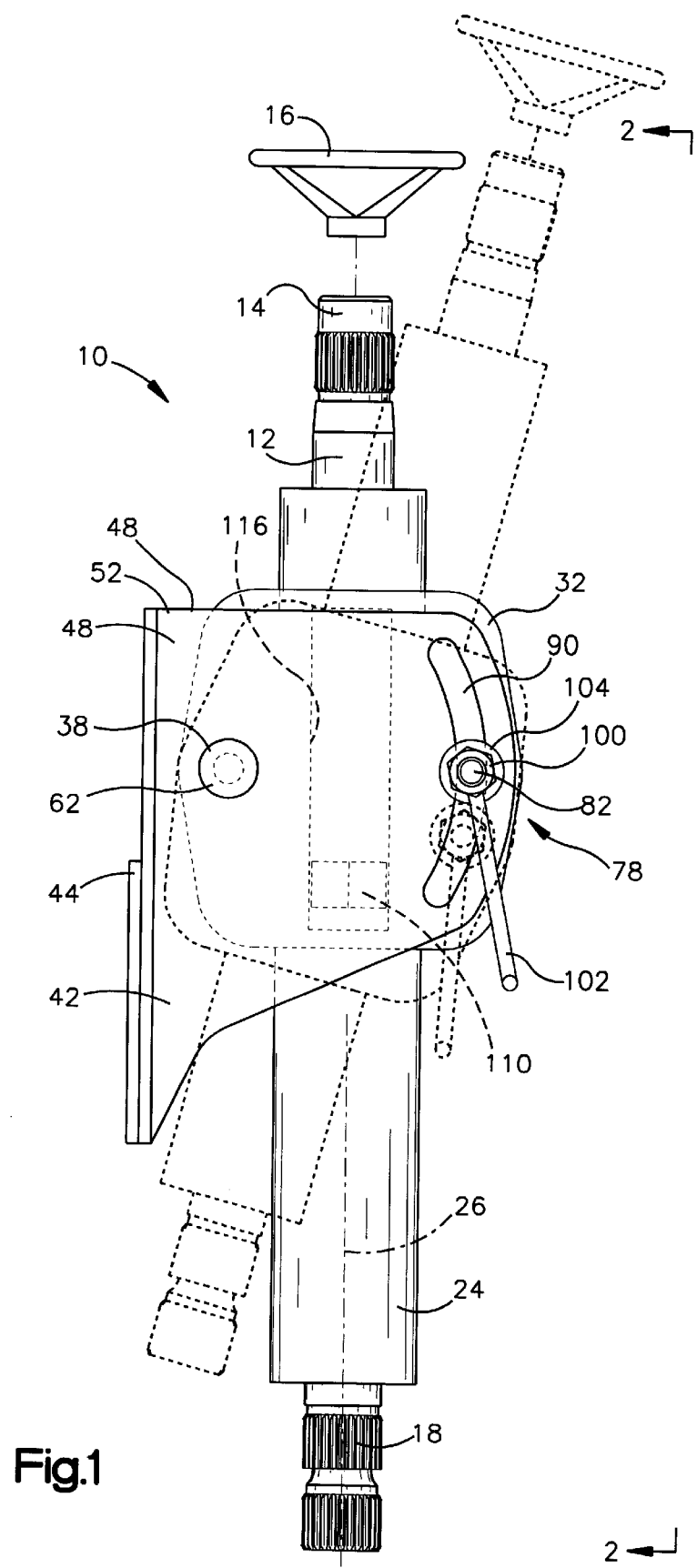
FIG. 1 is a schematic side view of a steering column of the present invention.

The present invention comprises an adjustable vehicle steering column 10 (FIG. 1). The steering column 10 is shown in two different positions in FIG. 1. The steering column 10 includes a rotatable steering column member 12. The steering column member 12 has an end 14 connectable with a steering wheel 16 in a manner known in the art.

An end 18 of the steering column member 12, opposite from the end 14, is connectable with a universal joint (not shown). The universal joint connected with the end 18 of the steering column member 12 is connected with a mechanism designed to transmit movement of the steering column member 12 to a steering gear and permit movement of the steering column member 12 relative to the mechanism.

A support tube 24 circumscribes the steering column member 12. A pair of bearings (not shown) support the steering column member 12 for rotation relative to the support tube 24. The support tube 24 supports the steering column member 12 for rotation about a longitudinal axis 26 of the steering column member. Upon rotation of the steering wheel 16, the steering column member 12 rotates about the longitudinal axis 26. Upon rotation of the steering column member 12 about the longitudinal axis 26, steerable vehicle wheels (not shown) are turned, as is known in the art.

Figure 2:
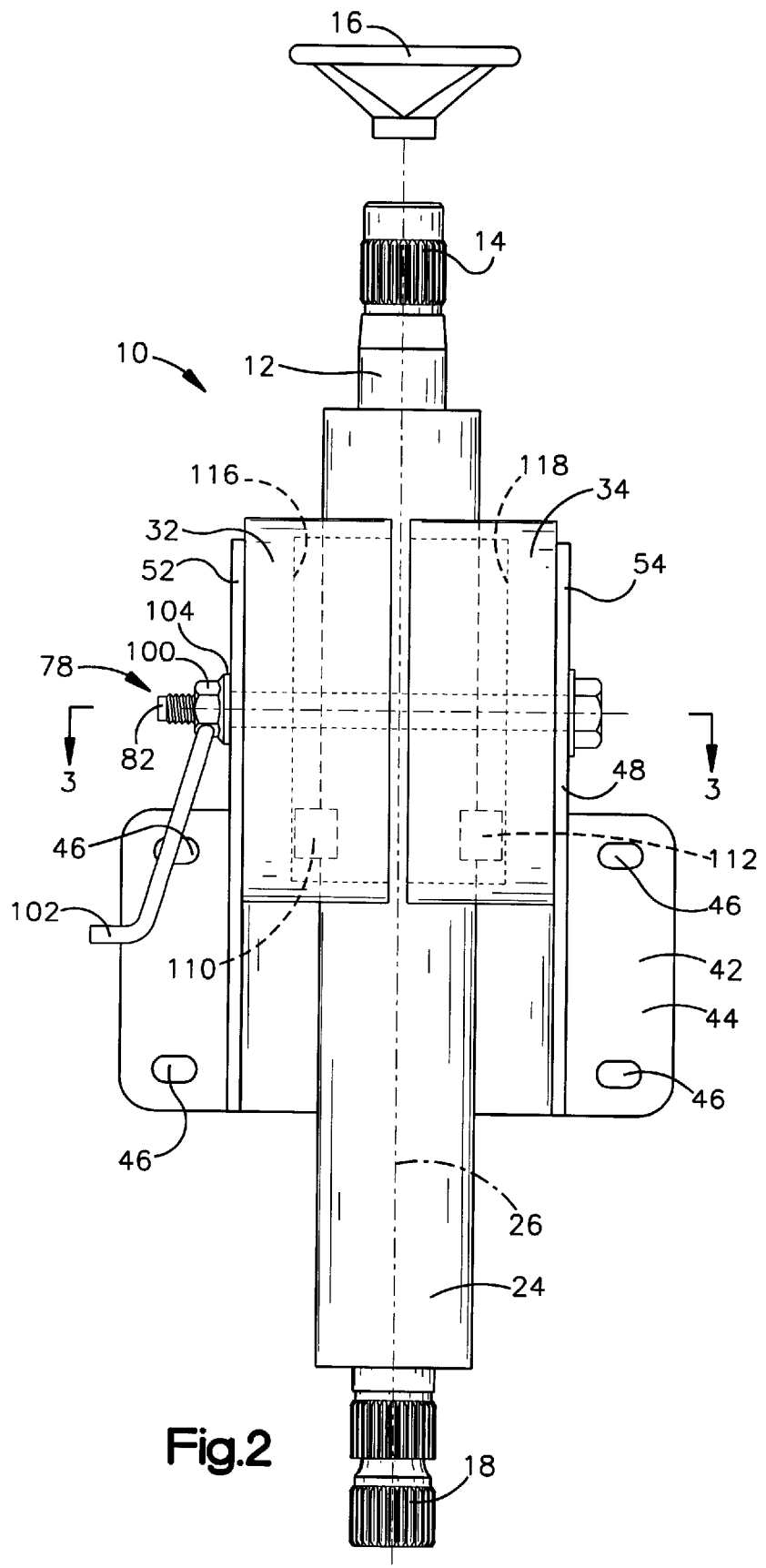
FIG. 2 is a schematic view of the steering column of FIG. 1 taken along the line 2—2.
Figure 3:
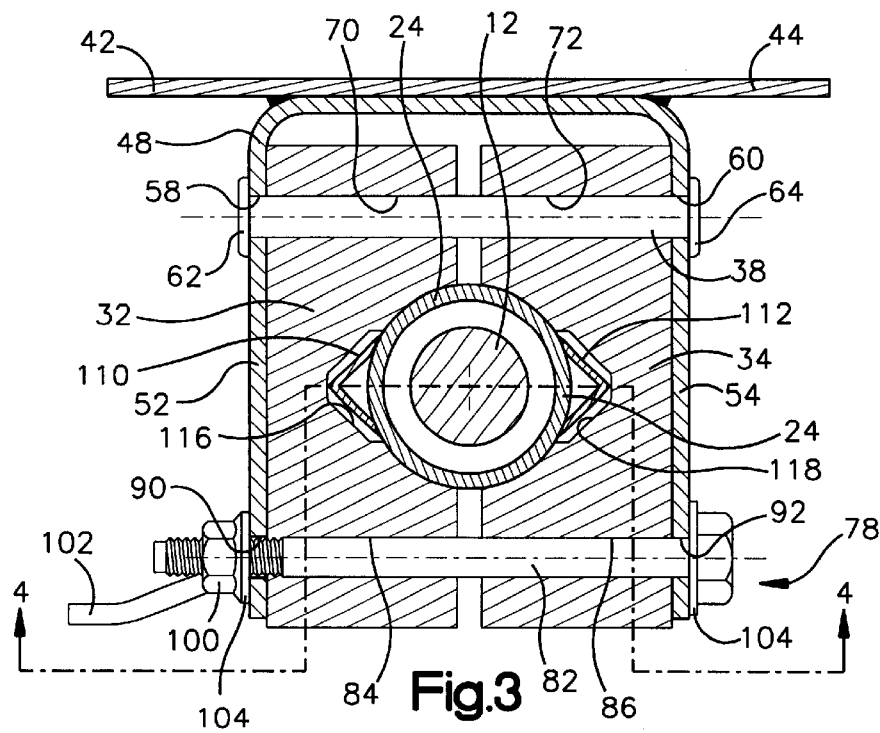
FIG. 3 is a sectional view of the steering column taken along the line 3—3 in FIG. 2.

The support tube 24 (FIGS. 2 and 3) and the steering column member 12 extend between a pair of clamping members 32 and 34. The clamping members 32 and 34 may have any desired shape. The support tube 24 and the steering column member 12 are axially movable relative to the clamping members 32 and 34. The clamping members 32 and 34 are pressed toward each other to clamp the support tube 24 to prevent movement of the support tube and the steering column member 12 relative to the clamping members 32 and 34.

A pivot shaft 38 (FIGS. 1 and 3) pivotally connects the clamping members 32 and 34 to a mounting bracket 42. The mounting bracket 42 connects the steering column 10 to a vehicle frame. The mounting bracket 42 (FIGS. 1–3) has a rear wall 44 with openings 46 for receiving fasteners to connect the mounting bracket to the vehicle frame. The mounting bracket 42 is connected to the vehicle frame using fasteners, as is well known in the art.

A U-shaped member 48 (FIG. 3) is welded to the rear wall 44. A pair of side walls 52 and 54 of the U-shaped member 48 extend from the rear wall 44 of the mounting bracket 42. The side walls 52 and 54 extend generally perpendicular to the rear wall 44 and parallel to each other.

The side wall 52 has an opening 58 through which the pivot shaft 38 extends. The side wall 54 has an opening 60 through which the pivot shaft 38 extends. The pivot shaft 38 includes radially extending ends 62 and 64. The radially extending end 62 of the pivot shaft 38 engages the side wall 52. The radially extending end 64 of the pivot shaft 38 engages the side wall 54. The radially extending ends 62 and 64 of the pivot shaft 38 retain the shaft in the openings 58 and 60 in the side walls 52 and 54.

The pivot shaft 38 (FIG. 3) extends through an opening 70 in the clamping member 32. The pivot shaft 38 extends through an opening 72 in the clamping member 34. The pivot shaft 38 pivotally connects the clamping members 32 and 34 to the side walls 52 and 54 of the mounting bracket 42.

A locking mechanism 78 presses the clamping members 32 and 34 toward each other to clamp the support tube 24 and prevent axial movement of the support tube and the steering column member 12 relative to the clamping members. The locking mechanism 78 also presses the side walls 52 and 54 toward each other and against the clamping members 32 and 34 to lock the clamping members in any one of a plurality of pivot positions relative to the mounting bracket 42. The locking mechanism 78 includes a locking shaft or bolt 82 (FIG. 3) which extends through openings 84 and 86 in the clamping members 32 and 34. The locking shaft 82 also extends through arcuate slots 90 and 92 (FIGS. 1 and 3) in the side walls 52 and 54. The locking shaft 82 moves relative to the side walls 52 and 54 when the clamping members 32 and 34 are pivoted relative to the mounting bracket 42.

The locking mechanism 78 includes a nut 100 threaded onto the bolt 82. A handle 102 extends from the nut 100 which can be manipulated by an occupant of the vehicle to lock and unlock the locking mechanism 78. The bolt 82 extends through a pair of washers 104 which engage in the side walls 52 and 54 of the mounting bracket 42.

Although the locking mechanism 78 is shown as a bolt 82 with a nut 100, it is contemplated that the locking mechanism may have a different construction. The locking mechanism 78 may have any construction that presses the side walls 52 and 54 toward each other and against the clamping members 32 and 34 with sufficient force to prevent movement of the support tube 24 relative to the clamping members and the clamping members relative to the mounting bracket 42.

A pair of radially outwardly extending projections 110 and 112 (FIGS. 3 and 4) are connected with the support tube 24. The projections 110 and 112 are engageable with the clamping members 32 and 34 to limit axial movement of the support tube 24 relative to the clamping members. The clamping member 32 has a recess 116 into which the projection 110 extends. The clamping member 34 has a recess 118 into which the projection 112 extends.

Figure 4:
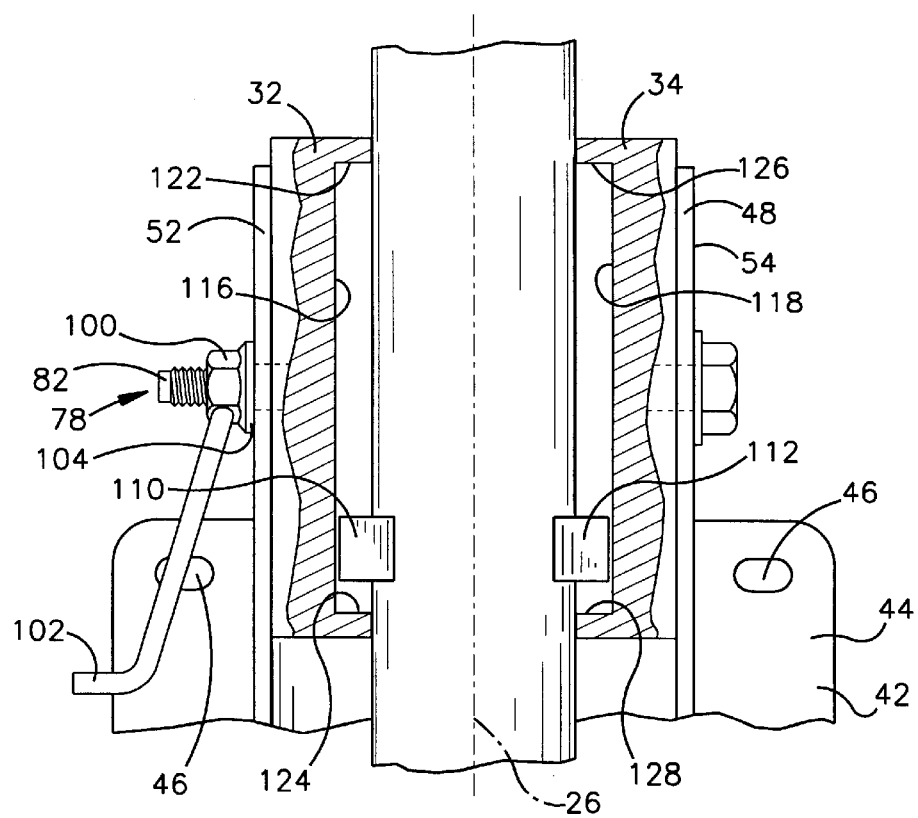
FIG. 4 is a partially sectional view of the steering column taken along the line 4—4 in FIG. 3.

The recess 116 in the clamping member 32 is partially defined by a pair of radially extending surfaces 122 and 124 (FIG. 4). The recess 118 in the clamping member 34 is partially defined by a pair of radially extending surfaces 126 and 128. The projections 110 and 112 engage the radially extending surfaces 122 and 126 to limit axial movement of the support tube 24 in the upward direction, as viewed in FIG. 4. The projections 110 and 112 engage the radially extending surfaces 124 and 128 to limit axial movement of the support tube 24 in the downward direction, as viewed in FIG. 4.

Upon pivoting the handle 102 in a counterclockwise direction, as viewed in FIG. 1, the nut 100 is partially unscrewed from the bolt 82. When the nut 100 is unscrewed from the bolt 82, the clamping members 32 and 34 may be pivoted about the pivot shaft 38 and the support 24 and steering column member 12 can be moved axially relative to the clamping members. After the clamping members 32 and 34 are positioned relative to the mounting bracket 42 and the support tube 24 is positioned relative to the clamping members, the handle 102 is rotated in a clockwise direction, as viewed in FIG. 1, to cause the nut 100 to be screwed onto the bolt 82. As the nut 100 is screwed onto the bolt 82, the side walls 52 and 54 are pressed toward each other to press the clamping members 32 and 34 toward each other. The clamping members 32 and 34 clamp the support tube 24 to prevent axial movement of the support tube relative to the clamping members. The side walls 52 and 54 engage the clamping members 32 and 34 to prevent pivotal movement of the clamping members relative to the mounting bracket 42.

From the above description of the invention, those skilled in the art will perceive improvements, changes and modifications. Such improvements, changes and modifications within the skill of the art are intended to be covered by the appended claims.

Having described the invention, the following is claimed:

1. A steering column comprising:
   a steering column member connectable with a steering wheel and rotatable to turn steerable vehicle wheels;
   a support tube circumscribing said steering column member and supporting said steering column member for rotation about a longitudinal axis of said steering column member;
   first and second clamping members engageable with said support tube, said support tube and said steering column member extending between said first and second clamping members and being axially movable relative to said first and second clamping members, said first and second clamping members being movable toward each other to clamp said support tube to prevent movement of said support tube and said steering column member relative to said first and second clamping members;
   a mounting bracket for connecting said steering column to a vehicle frame, said mounting bracket having first and second side walls;
   a pivot shaft pivotally connecting said first and second clamping members to said mounting bracket; and
   a locking mechanism for pressing said first and second clamping members toward each other to clamp said support tube and prevent axial movement of said support tube and said steering column member relative to said first and second clamping members and for locking said first and second clamping members in one of a plurality of pivot positions relative to said mounting bracket, said locking mechanism having a locking shaft extending through said first and second clamping members and through said first and second side walls.

2. A steering column as defined in claim 1 wherein said first and second side walls of said mounting bracket are engageable with said first and second clamping members, said locking mechanism pressing said first and second side walls toward said first and second clamping members to clamp said support tube between said first and second clamping members and prevent axial movement of said support tube and said steering column member relative to said first and second clamping members and to prevent pivoting of said first and second clamping members relative to said mounting bracket.

3. A steering column as defined in claim 2 wherein each of said first and second side walls includes an arcuate slot through which said locking shaft extends to guide pivotal movement of said first and second clamping members relative to said mounting bracket.

4. A steering column as defined in claim 1 wherein said pivot shaft extends through said first and second sides walls and through said first and second clamping members.

5. A steering column as defined in claim 1 wherein said support tube includes a projection engageable with at least one of said first and second clamping members to limit axial movement of said support tube and said steering column member relative to said first and second clamping members.

6. A steering column as defined in claim 5 wherein said projection extends radially into a recess in said first clamping member, said projection being engageable with a radially extending surface defining said recess to limit axial movement of said support tube and said steering column member relative to said first and second clamping members.

* * * * *